United States Patent [19]
Chasek

[11] 4,317,117
[45] Feb. 23, 1982

[54] CROSS CORRELATED DOPPLER RADAR/INFRA RED VELOCITY AND PRESENCE SENSOR

[76] Inventor: Norman E. Chasek, 24 Briar Brae Rd., Stamford, Conn. 06903

[21] Appl. No.: 59,332

[22] Filed: Jul. 20, 1979

[51] Int. Cl.³ .............................................. G01S 13/86
[52] U.S. Cl. ..................................... 343/6 ND; 343/8
[58] Field of Search ................................ 343/6 ND, 8

[56] References Cited
U.S. PATENT DOCUMENTS 3,195,126  7/1965  Barker ................................ 343/8 X

OTHER PUBLICATIONS

H. A. Geller et al.; A Data Acquisition System for Unobtrusive Measurement of On-Road Driving Behaviour; Behaviour Research Methods and Instrumentation; Nov. 1975; vol. 7, No. 6, pp. 526-530.

*Primary Examiner*—T. H. Tubbesing
*Attorney, Agent, or Firm*—Parmelee, Johnson, Bollinger & Bramblett

[57] ABSTRACT

A doppler radar and infra red sensor focused by common means onto a region, will, with appropriate cross correlation, provide improved velocity and presence sensing in a complex uncontrolled environment. The illustrative overhead, roadside traffic sensor employs a common microwave/infra red parabolic reflector and illuminating feed. The sensor can be conveniently mounted onto utility poles without cutting up the road or hanging overhead arbors. The velocity and presence data it provides can be used to determine vehicular headway, density, volume, vehicle size, aggregate momentum, aggregate congestion, platoon arrival, queue length, etc. This novel sensor reduces spurious indications, permits oblique angle viewing of vehicles, reduces doppler transmitter power levels so as to be well below normally accepted environmentally safe levels, and discriminates against vehicles moving in the wrong direction. The improved information will make possible better adaptive traffic signal timing methods to reduce fuel consumption and auto emissions. An additional feature provided by this sensor is that it detects emergency and mass transit vehicles to expedite their safe movement.

2 Claims, 11 Drawing Figures

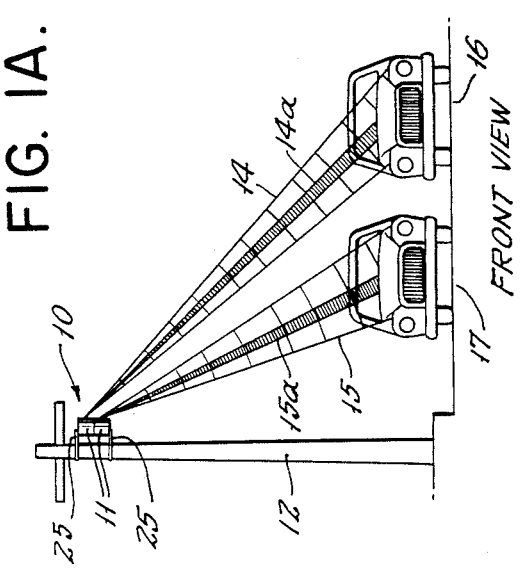
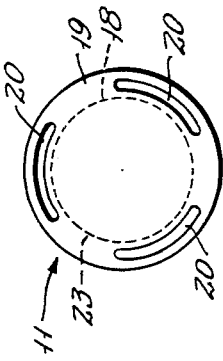
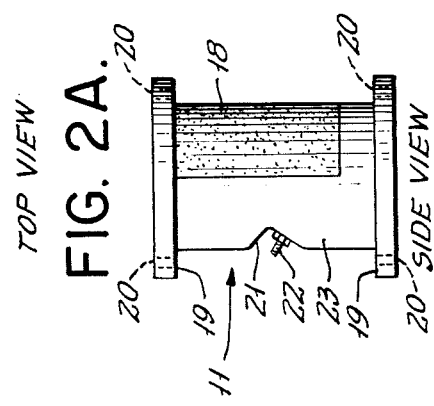
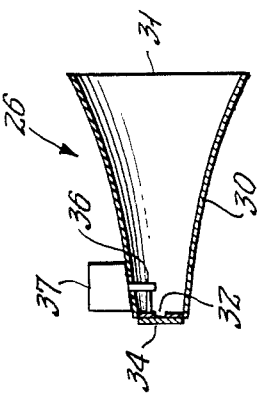
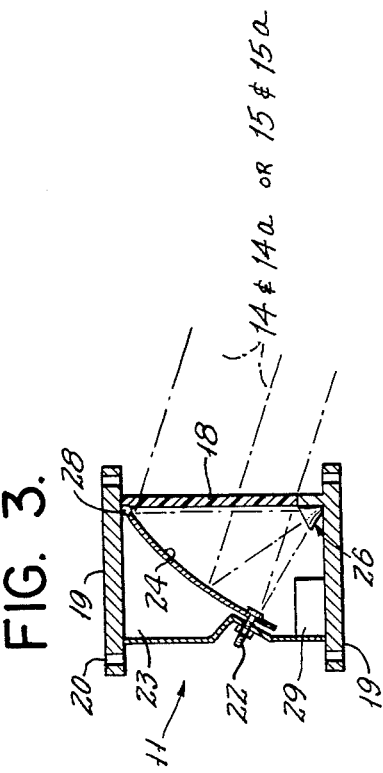
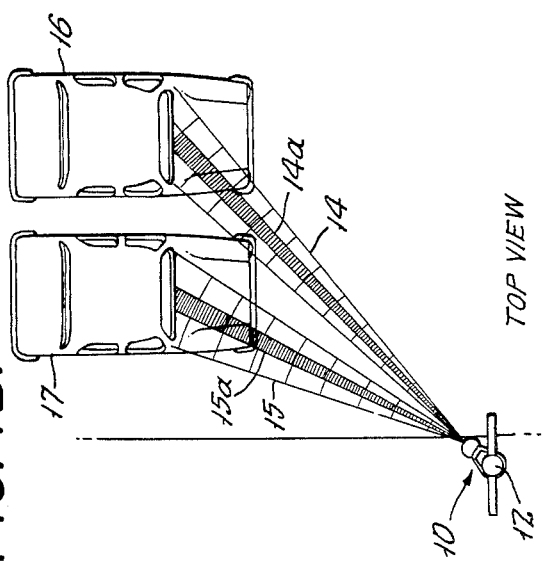

CROSS CORRELATED DOPPLER RADAR/INFRA RED VELOCITY AND PRESENCE SENSOR

BACKGROUND

Although the original purpose of traffic signals was safety, the adaptive timing of traffic signals by electronic eyes and brains can significantly improve the smoothness of vehicular flow, thereby acting to reduce fuel consumption and emissions, expedite the flow of mass transit and emergency vehicles, save drive time, and reduce wear and tear. In order for the electronic brains to optimize traffic signal timing, electronic eyes must provide adequate information. It has been determined that vehicular presence and velocity are the two necessary ingredients from which all other necessary roadway traffic information can be derived. As a rule, presence sensors do not indicate velocity and velocity sensors are not effective at perceiving stopped vehicular presence. The measurement of the wide range of velocities, i.e., 1–50 mph, the varieties of vehicles, the often erratic flow patterns, the appearance of emergency vehicles and mass transit vehicles, the public environment, weather conditions, and the cost of equipment, installation and upkeep must all be satisfied by the sensor and its operating characteristics. Sensor mounting requirements are often costly and cause traffic disruptions during installation. In the case of overhead arbors, they can be unattractive. If emergency and mass transit vehicles are to be sensed so as to expedite their safe passage, additional sensors are necessary. A single sensor that indicates velocity, presence and special vehicle identification, is convenient to mount, and safely and attractively functions in the increasing complexities of a public environment will serve an important service.

SUMMARY

This disclosure describes a traffic sensor and its associated processing circuits to monitor vehicular presence, to identify special vehicles like emergency and mass transit vehicles, and to measure vehicular velocity. Each sensor head monitors a specific lane from an overhead roadside location. For multi-lane roads, several sensor heads are stacked and aimed at each lane. Each sensor head contains an adjustable parabolic reflector that focuses both infra red and microwave energy and a common reflector illuminator feed located at the focus of the parabola, which contains a doppler receiver/transmitter and infra red (IR) sensor that is integrated into a short waveguide section. The infra red sensor, a slice of suitable dopped germanium, is mounted onto a reactive short circuiting microwave iris. The doppler receiver-transmitter, which uses a tunnel diode device for low microwave power output, is transversely coupled into the waveguide section. The open end of the waveguide is flared to form a horn antenna.

The information processing that occurs in the cross correlating circuits includes a means for frequently establishing a road-surface-infra-red-emission-reference level. This is accomplished in the illustrative IR reference circuit by determining that the IR level impinging on the IR sensor has been constant for a time that is related to the velocity of the last vehicle to traverse the beam. After this constancy has been established, the very next doppler indication, while the IR level is still unchanged, momentarily acts to sample and store the IR output voltage to serve as a reference level. Presence is established by doppler indications followed by a difference between real time IR output and the stored IR reference level. Doppler frequencies are measured after both presence and doppler signal levels above threshold levels have been established.

The presence of emergency or mass transit vehicles is established by a modulated IR or microwave emitter mounted on designated vehicles. This emitter is modulated at a rate roughly twice that of the highest frequency normally processed. The reception of this designated modulation indicates presence of a special vehicle. Gating the low frequency amplifier at the replicated square wave modulated rate permits simultaneous monitoring of traffic conditions with special vehicle detection.

The illustrative velocity indicating circuit reduces required doppler radar transmitter power and generally improves the measurement accuracy over a very wide range of velocities. The circuit splits the doppler frequency band and measures the number of doppler zero crossings over a given time interval in the upper frequency band, when adequately strong doppler signals are received, and measures the number of clock cycles that occur during a single doppler zero crossing received in the lower band.

A tunnel diode implementation for the doppler radar receiver-transmitter and special vehicle emissions detector is described. This implementation further reduces required doppler transmitter power while keeping sensor costs moderate.

The various aspects and advantages of this invention will be more fully understood from a consideration of the following detailed description in conjunction with the accompanying drawings in which:

FIGS. 1A and 1B illustrate the sensor mounted to a utility pole and its microwave and infra-red beam focused on a lane.

FIGS. 2A and 2B illustrate the sensor enclosure and provisions for aiming and stacking several sensors together.

FIG. 3 illustrates method of common focusing and illuminating of infra red and microwave radiation.

FIG. 4 illustrates how the doppler radar and infra red sensor are inserted into the illuminating element.

DETAILED DESCRIPTION OF THE EMBODIMENTS OF THE INVENTION

Figure 5:
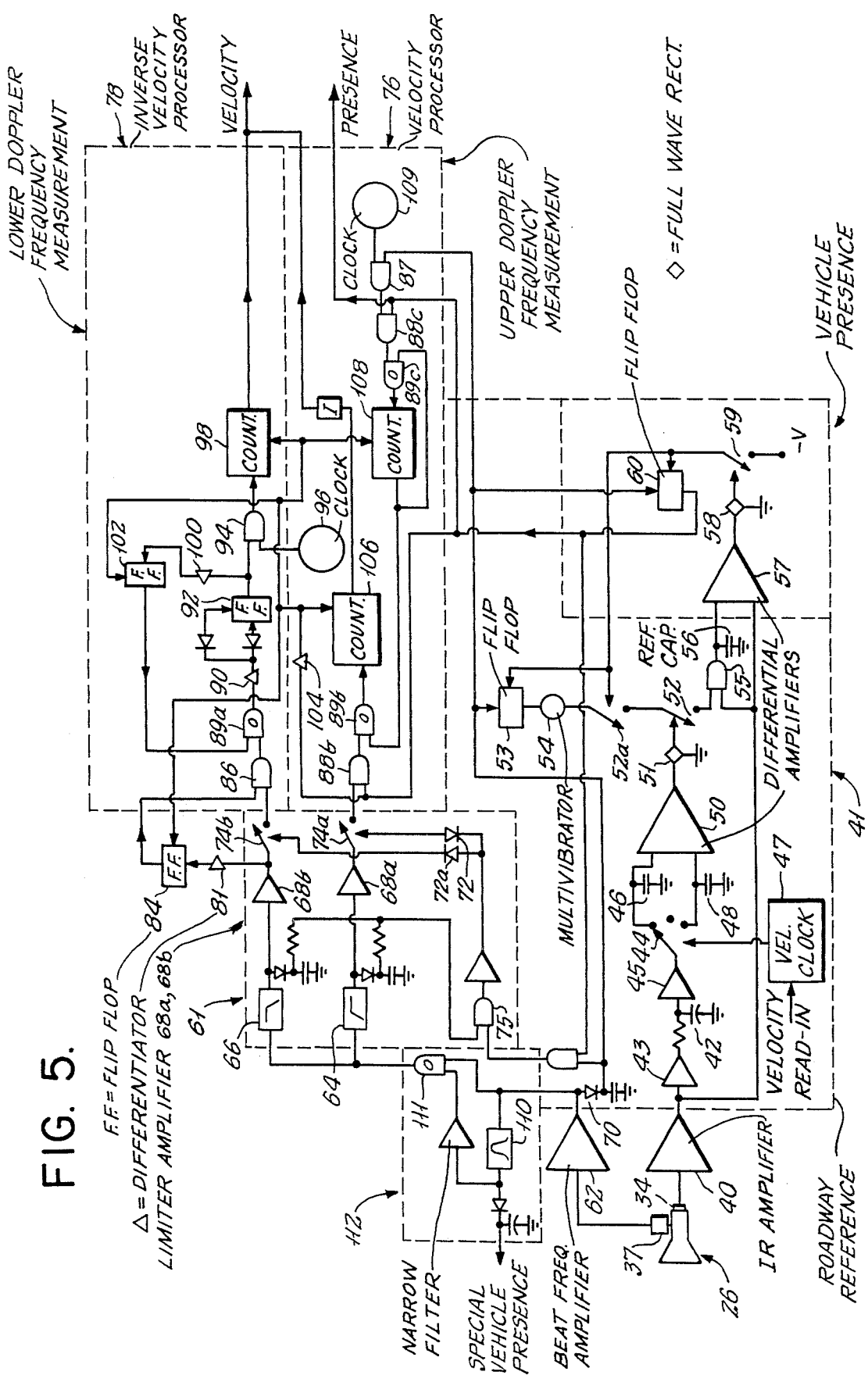
FIG. 5 is a block diagram of the various electrical circuits used to implement the doppler radar and infra red sensor signal processing.

Referring to the drawings in detail, FIGS. 1A and 1B illustrate an overhead, roadside mounting of the sensor. Sensor head assembly 10 includes two stacked sensors, 11, mounted on utility pole 12 and focused microwave beams, 14 and 15 and focused IR beams 14a and 15a are aimed onto roadway segments or lanes 16 and 17, illustratively shown as containing vehicles.

FIG. 2A illustrates the exterior design of one embodiment of the generally cylindrical sensor head 11. Window, 18, made of polyethylene, a material transparent to microwave and infra red energy, is located in one side of the housing 23 and permits microwave and infra red energy to pass through an otherwise cylindrical metallic housing 23.

As seen in FIG. 2B, each rim 19 of the housing 23 has three elongated arcuate hole patterns 20. These arcuate slots 20 allow the sensor heads 11 to be stacked above one another and adjusted in azimuth for aiming. Fastening means (not shown) such as a plurality of bolts fitting into the respective slots 20 serve to secure the sensor heads together in their stacked and adjusted positions forming the completed assembly 10 (FIG. 1A). A pair of brackets 25 (FIG. 1A) are bolted to the slots 20 in the top and bottom rims of the uppermost and lowest units 11 in the stacked assembly 10 for conveniently mounting the assembly on the pole 12. Moreover, the use of such brackets 25 permit the whole assembly 10 to be adjusted in azimuth relative to the pole 12. Thus, the whole assembly is conveniently adjustable in azimuth while the individual units of 11 are also conveniently independently adjustable in azimuth relative to each other, and their individual reflectors 24 (FIG. 3) are conveniently independently adjustable in tilt elevation.

An indented pocket 21 in the housing 23 contains parabolic reflector tilt adjustment screw 22 which adjusts the tilt of the reflector for adjusting the elevation angle of the beams 14 and 14a or 15 and 15a.

FIG. 3 illustrates in elevational section the interior of a sensor head 11 including parabolic reflector 24, and the associated illumination feed apparatus 26 which is located at the focal point of the reflector 24. Reflector 24 is a polished metallic surface that reflects both microwave and infra red energy. Pivoting joint 28 on which the reflector 24 is mounted and tilt adjusting screw 22 are also shown. Low frequency pre-amplifiers for doppler radar and IR sensor operation are located in housing 29.

FIG. 4 illustrates details of illuminator feed 26. The feed is a short section of waveguide 30 flared at one end 31 to form a horn antenna designed to fully illuminate reflector 24 and pass infra red energy, unobstructed, to the opposite end of the waveguide, where iris 32 terminates the waveguide, short circuiting microwave energy but passing infra red energy onto germanium slice 34 mounted behind iris 32. Resonant magnetic coupling loop 36 couples microwave energy between a doppler radar receiver-transmitter, located in housing 37, and waveguide 30. The focal point of reflector 24 should coincide with germanium slice 34.

FIG. 5 illustrates preferred embodiments of signal processing circuits. The functions served by these circuits are:

(1) to frequently establish an IR reference level from the road surface, when cleared of vehicles, (2) to determine that changes in the IR level from the said reference level have occurred, (3) to indicate vehicular presence by a period initiated with the coincidence of a doppler received signal and an IR level difference from said reference level and terminated by a return of the IR level to the said reference level, (4) to measure the doppler frequency in the shortest possible time interval during coincident conditions of vehicular presence and doppler received signal levels above an established threshold, (5) to employ devices that result in the lowest possible microwave transmitter power level.

A method for establishing that the IR sensor is viewing the road surface, prior to updating the IR reference level, is to first establish that the IR level has not changed for a time period that is related to the previously passing vehicle velocity, and then to sample the IR level for an update of reference at the first moment that a doppler signal is subsequently sensed and no change has yet occurred in the IR level. This sampling moment should coincide with a view of the road surface just in front of an oncoming vehicle; since the microwave beam is not as sharply focused as the IR beam, it will sense the vehicle's presence first. A circuit that accomplishes this logical sequence is shown in Box 41.

The germanium slice 34 (FIGS. 4 and 5) is connected to an IR amplifier 40 (FIG. 5). The output from IR amplifier 40 is isolated from time averaging capacitor 42 by isolation amplifier 43. Capacitor 42 is isolated from sample and hold circuit 44 by a second isolation amplifier 45. Sample and hold circuit 44 momentarily samples capacitor 42 and stores the sampled voltage on capacitor 46. After a suitable interval, determined by a velocity controlled clock 47 capacitor 42 is again sampled, but this sampled voltage is stored on capacitor 48. The time period between sampling is determined by the velocity of the preceding vehicle. For example, if that vehicle were moving at 20 feet per second, the sampling interval might be 0.25 seconds, whereas if it were moving at 10 feet per second, the sampling interval might be 0.5 seconds. The difference voltage between the two sampled voltages on capacitors 46 and 48 is amplified in differential amplifier 50 and fed into full wave rectifier 51 which activates switch 52 so that a zero voltage difference would close an otherwise open switch.

The second condition necessary prior to re-establishing an IR reference level is the presence of a doppler signal coincident with switches 52 and 52a being closed. This is accomplished by flip flop 53 which is fired by the presence of a doppler signal. Flip flop 53 in turn fires multi-vibrator 54, which establishes the sampling time. Its pulse is fed through switches 52 and 52a into sampling gate 55; which in turn feeds the output from IR amplifier 40 for the sampling interval, into hold circuit 56, thus establishing the IR reference level.

This reference voltage is compared with the real time output from IR amplifier 40 in difference amplifier 57, whose output is full wave rectified by rectifier 58 which then actuates switch 59. When the output from full wave rectifier 58 is zero, switch 59 is closed. This resets flip flop 53 and closes switch 52a. This sequence establishes the IR reference level.

The vehicle presence is established by the fired condition of flip flop 60. Flip flop 60 is fired by a doppler signal presence that is coincident with switch 59 being closed. Switch 59 is closed by any perceptible difference existing between the IR reference level and the output from IR amplifier 40. Flip flop 60 is reset by the same conditions that reset flip flop 53.

A velocity measurement requires the measuring of the doppler frequency, corrected for viewing angle, as each vehicle passes the viewed spot of roadway. The poorer resolution of the microwave beam compared to the IR suggests that spurious responses are possible, especially because of the oblique viewing angles which generate a wide variation in radar reflection cross section. Vehicles moving in the opposite direction in adjacent lanes can create spurious results. However radar returns reflect from the front surfaces of an approaching vehicle while the infra red responses occur over the entire vehicle. Because the microwave beam is wider than the infra red sensing beam, a vehicle traveling toward the sensor will first initiate a radar signal and then an infra red response. A vehicle traveling away from the sensor will produce an infra red voltage before the radar signal, which, in this case, comes from the rear surfaces of the vehicle. Since IR voltage changes will normally occur first, the result of this circuit is to provide minimal response from reverse direction vehicles.

There is an advantage in reducing the doppler transmitter power to lowest possible levels for environmental impact reasons. Oblique angle viewing results in a wide range of rapidly varying reflection scintillations. It is therefore desireable to make the velocity measurements as quickly as possible on the strongest returns while accounting for durations of weak signal levels. A preferred method that accomplishes these objectives is illustrated in Box 61.

The doppler beat frequency from the radar receiver-transmitter 37 (FIGS. 4 and 5), amplified in amplifier 62 is split by filters 64 and 66 into upper and lower bands. The split frequency between these bands could, for example, correspond to that doppler frequency generated by a passing vehicle traveling at 6 mph. The output of each filter is then amplified by limiter amplifiers 68*a* and 68*b*. Oppositely poled diodes 72 and 72*a* provide an output that closes either switch 74*a* or 74*b* depending on whether the output from balanced diodes 72 and 72*a* is positive or negative. This output passes through gate 75 which is opened whenever doppler signals exceed a threshold level determined by level sensing circuit 70. Switch 74*a*, in series with the upper split band, feeds into velocity processor, 76. Switch 74*b*, in series with the lower split band, feeds into inverse velocity processor, 78.

The velocity processors can employ the same frequency measurement circuit or employ a circuit that is optimized for the frequency range of the measurement since the frequency range to be measured can extend over a 50 to 1 range that is further complicated by scintillations. Preferred optimized circuits are described by FIG. 5. The doppler signal in the low frequency channel, after being hard limited in limiting amplifier 68*b*, is differentiated by differentiator 81. The zero crossings sensed by differentiator 81, produce pulses which fire flip flop 84, said flip flop eventually being reset when the vehicular presence voltage returns to zero. Flip flop 84 opens gate 86 when fired, feeding the processed doppler signal through normally open gate 89*a*. When gate 86 is opened, the limited doppler signal is applied to differentiator 90 whose positive output fires flip flop 92 and whose negative output resets flip flop 92. The fired condition of flip flop 92 opens gate 94 allowing signals from clock 96 to feed counter 98. When flip flop 92 is reset, differentiator 100 fires flip flop 102 which closes normally open gate 89*a*. Both flip flops 102 and 84 and counter 98 are cleared by a return to zero of vehicular presence voltage as sensed by differentiator 104. The count registered in counter 98 is proportional to the reciprocal of frequency, so it must be numerically inverted and multiplied by a constant to indicate velocity.

The doppler signal in the high frequency channel feeds through normally closed gate 88*b* and normally open gate 89*b*. Gate 88*b* is opened by the vehicular presence voltage and the signal feeds into counter 106. Gate 89*b* is closed when a prescribed count is reached in counter 108. The count in counter 108 is determined by the number of cycles fed to it by clock 109 through normally closed gates 87 and 88*c* and normally open gate 89*c*. Gate 88*c* is opened by vehicular presence voltage, gate 87 by sufficient doppler level and gate 89*c* is closed when counter 108 reaches its prescribed count. Both counters are cleared when the presence voltage goes to zero. The count read out of counter 106 is proportional to vehicular velocity. Counter 108 will reach its prescribed full count only when doppler signal level is above threshold and vehicular presence is maintained for an entire prescribed measurement interval.

Special vehicle presence can be indicated, without blocking out normal sensed traffic data, by a method illustrated by circuit 112. In this example, special vehicles are equipped with a microwave source that is square wave modulated by a frequency approximately twice the highest doppler frequency expected. This signal is filtered out of the output of doppler amplifier, 62, by narrow filter 110 tuned to the modulation frequency. This output is rectified and indicates presence of a special vehicle requesting priority. Any specific priority can be a function of a secondary encoding. The filtered sine wave is also used to open and close gate 111 which samples doppler signals at twice their highest frequency. When the subsequent band limiting at half this frequency occurs, the resulting doppler output will not be perturbed.

Figure 6A:
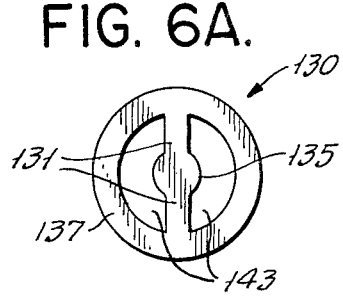
FIGS. 6, 6A, 6B and 6C illustrate one embodiment of the illuminator using a tunnel diode.
Figure 6:
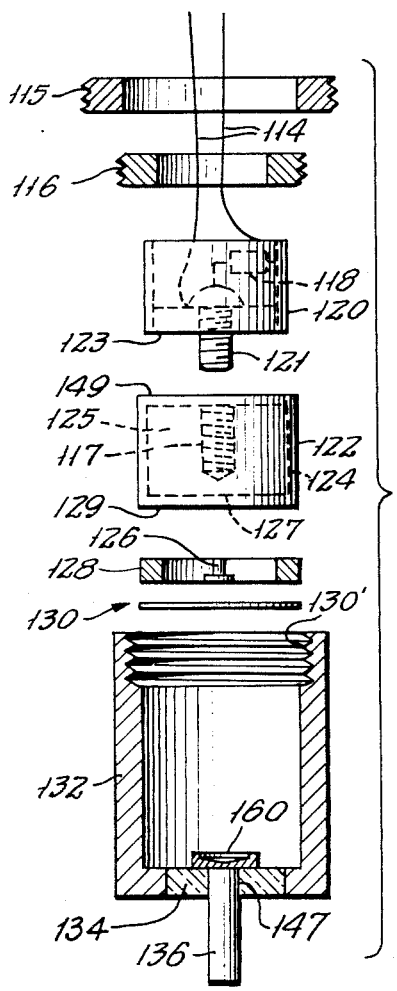

This doppler radar transmits a continuous wave microwave signal that also beats in a mixer with reflected signals from moving objects, generating a doppler beat frequency. There are various low power microwave sources that can be used for such a transmitter. The preferred embodiment would use a tunnel diode because its output power and noise level is inherently low and it can also serve simultaneously as the mixer and a detector of special vehicle emissions. For improved range, two tunnel diode devices can be used, one for the microwave source and one, a lower peak current diode, for mixing and detecting. The two diodes are separated by a ferrite circulator. The circulator directs microwave emissions into the waveguide illuminator and directs received reflected signals and emitted signals into the mixer-detector diode. A preferred design for the tunnel diode circuit is illustrated in FIG. 6. Its structural details are shown in FIGS. 6, 6A, 6B and 6C.

A laterally projecting cylindrical housing in housing 37 receives doppler module sub-assembly 119 including a cylindrical casing 132. This casing 132 contains an output/input probe coupler 136 which extends through a central hole 147 in a ceramic window 134. This ceramic window pane 134 has a metallized coating around its central hole 147 to which the probe coupler 136 is soldered. Also, the periphery of the ceramic window is metallized and is soldered to a port 149 in the end wall 151 of the cylindrical casing 132. Into this casing 132 goes a tuning strap inductor member 130 (see also FIG. 6A), a conductive spacer ring 128, and a tunnel diode 126.

The radio frequency (R.F.) sub-assembly 119 for the tunnel diode 126 includes an R.F. bypass capacitor 124' formed by a cylinder of conductive metal 125 coated with a thin dielectric layer 124 with an outer annular conductive cylindrical sleeve 122 pressed over this dielectric layer 124. For example, the metal cylinder element 125 may be aluminum with an anodized coating 124 on its cylindrical periphery. An alternative way in which to form the thin dielectric layer 124 is to use a very thin sleeve of low-loss insulating plastic, for example, such as the fluorocarbon resing plastic obtainable commercially under the trademark "Teflon", which is then sandwiched between the conductive cylinder element 125 and the sleeve 122.

The outside diameter (O.D.) of the sleeve 122 is slightly smaller than the inside diameter (I.D.) of the casing 132 so that this sleeve 122 can slide into the casing 132. Also, the lower rim 129 of the sleeve 122 extends down slightly beyond the flat lower end 127 of the conductive element 125 so that the conductive spacer ring 128 does not inadvertently short-circuit the capacitor 124'. The upper rim 149 of sleeve 122 extends up beyond the element 125 so that the housing 120 cannot touch the cylindrical element 125.

The tunnel diode 126 is inserted and held in position between the flat lower end 127 of the cylinder element 125 which acts as a ground plane and the central portion 135 (FIG. 6A) of the resonant tuning inductor member 130, which is spaced from this ground plane by the spacer ring 128. This ring 128 presses the circular rim 137 of the inductor member 130 down upon the end wall 151 of the doppler module casing 132. Thus, the outer ends of the inductor strap 131 are grounded to the casing 132 and are grounded to the ring 128.

Figure 6B:
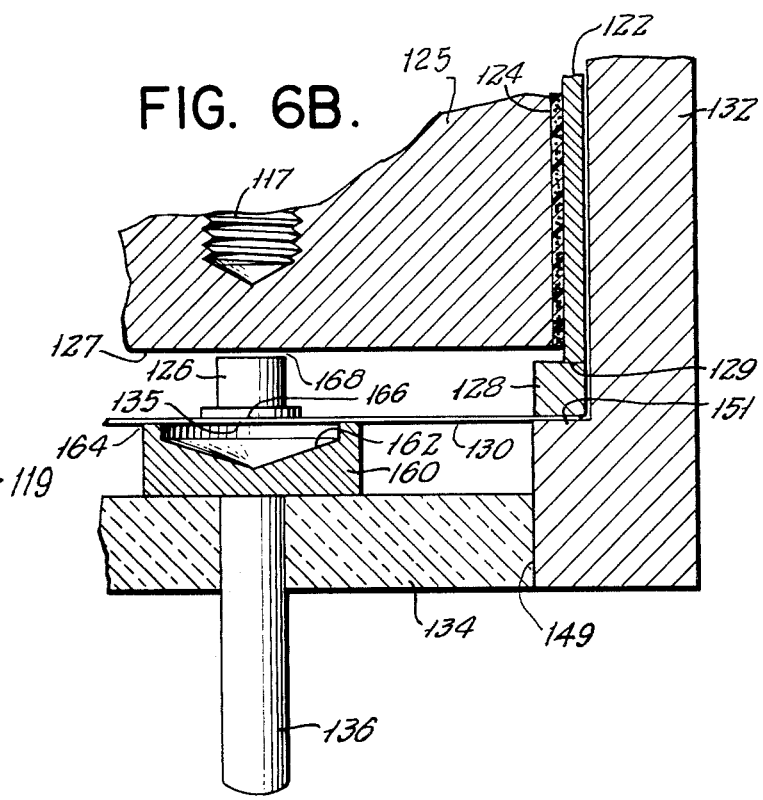

As shown enlarged in cross section is FIG. 6B the probe coupler 136 has an enlarged head 160 which has a cup shaped top surface 162. The enlarged central portion 135 of the inductor strap 131 rests upon the rim 164 and spans over the cup 162. The tunnel diode 126 generally has an inverted top hat configuration with conductive terminal surfaces 166 and 168 on its bottom and top. The conductive cylindrical element 125 presses down on the terminal surface 168, while the resilient central portion 135 of the inductor strap acts like the dished spring element pressing firmly and resiliently up against the other terminal surface 166, thereby maintaining good electrical contact with both ends of the tunnel diode 126 in spite of any expansion or contraction due to ambient temperature changes.

Figure 6C:
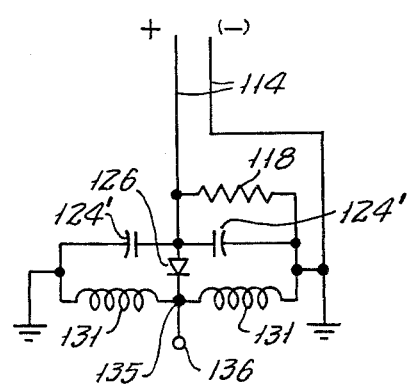

In FIG. 6C is a schematic electrical circuit diagram showing the oscillator/mixer circuit with the tunnel diode 126 in connection with the mid-point of the inductor 131 formed by the diametrically extending conductive strip 131 (FIG. 6A) of the tuning strap member 130. The first terminal 166 of diode 126 seats against the enlarged central region 135 of this strap. The terminal screw 121 and the positive lead 114 and the resistor 118 are electrically connected through the cylindrical element 125 to the second terminal 168 of the diode 126, while the first terminal 166 of the diode is connected to the other (ground) lead 114 through the inductor strap 131.

The inductor strap 131 and tunnel diode capacitance acts as a resonant circuit which determines the frequency of oscillation of the tunnel diode oscillator circuit (FIG. 6C). This frequency can be tuned by shaping the tuning strap member 130 (FIG. 6A). Namely, the longer and thinner that the inductor strap 131 is made and the larger that the semi-circular openings 143 are made, then lower the frequency of the microwave energy to be generated, and vice versa.

The preceding descriptions are of a microwave doppler radar implementation. An ultra sonic doppler radar could be used in place of the microwave doppler radar with the disadvantage of reduced range.

I claim:

1. A method for sensing presence and velocity of objects expected to pass through or reside in a predetermined region comprising the steps of:
    aiming a doppler radar beam at said predetermined region,
    sensing radar reflections from objects moving through said region,
    beating the frequency of said reflections with the transmitted frequency and using the presence of a beat frequency to indicate a moving object in said region,
    measuring the beat frequency to indicate the velocity of the object moving through said region,
    sensing infra red emissions from said region in the absence of any object, for the purpose of establishing a reference level, and
    indicating presence of said object in said region by the IR emissions which are different from said reference level.

2. Apparatus for sensing the presence and velocity of an object in a region comprising,
    a protective housing including a window that passes microwave and infra red radiation,
    a parabolic reflector within said housing for focusing both microwave and infra red radiation arriving through said window,
    a feed means located at the focus of said parabolic reflector for illuminating said reflector, said feed means including an infra red level sensing element and a coupler for a doppler radar receiver-transmitter,
    a doppler radar mixer-transmitter connected to said coupler,
    a plurality of low frequency amplifiers one of said amplifier being connected to said radar mixer-transmitter and the other being connected to said infra red sensing element,
    a sample and hold circuit to retain voltage samples representative of IR emissions from said region when free of objects to establish a reference level,
    a circuit that establishes presence by indicating whenever IR levels differ from said reference following a doppler radar indication of entry into said region and,
    a circuit for measuring the doppler beat frequency when coincident with said presence indication.

* * * * *